Figure 1:
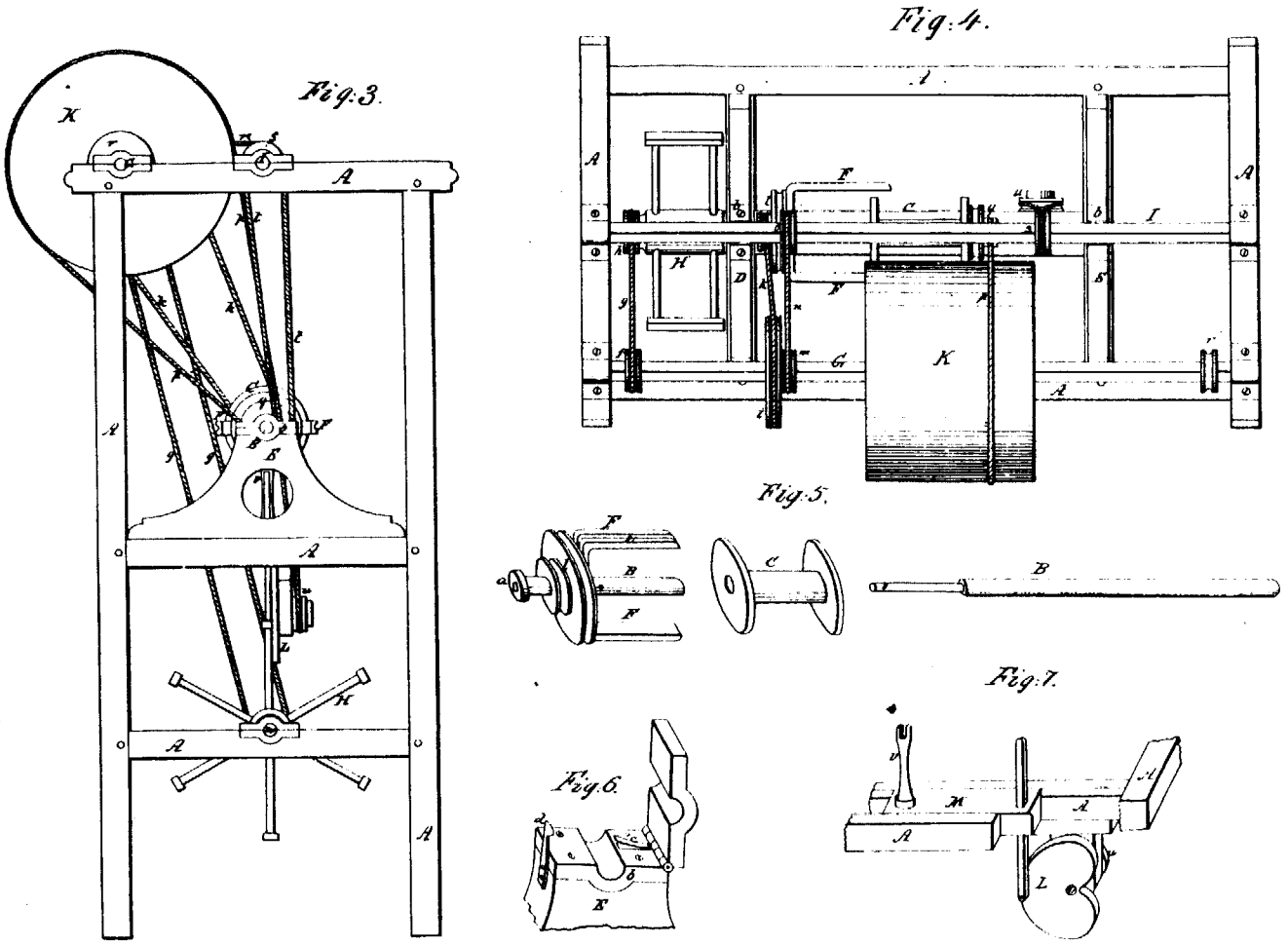
Figure 2:
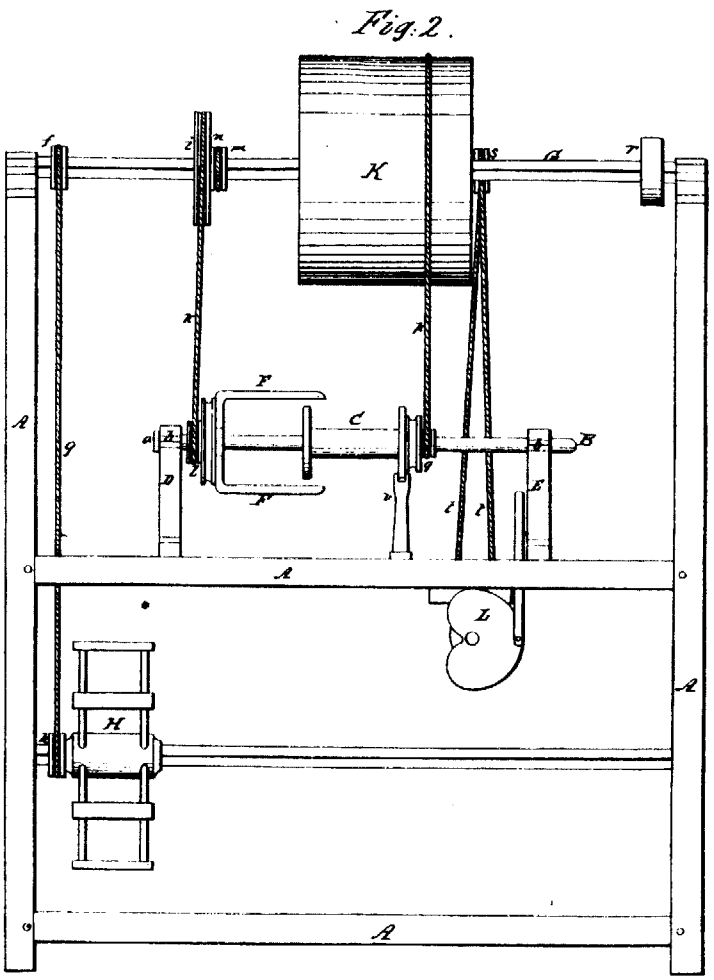
Figure 1:
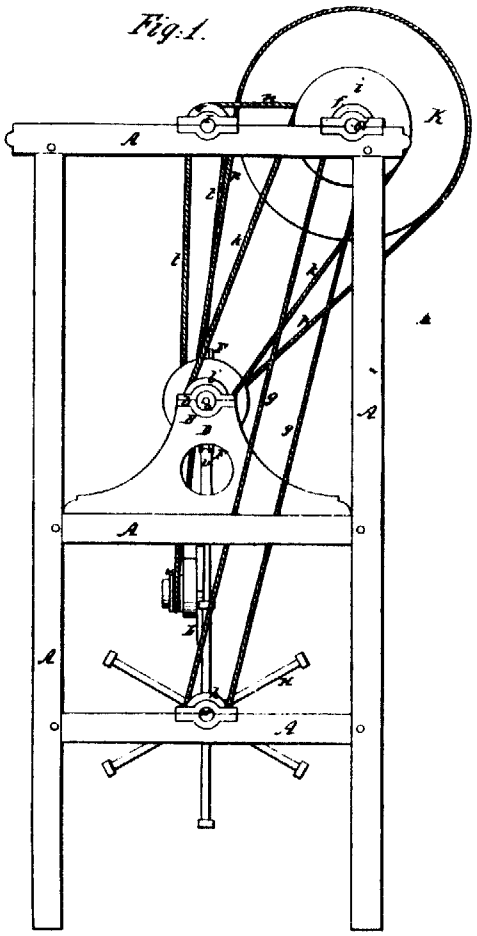

Sheet 1. 2 Sheets.

A. Caldwell.
Throstle.

9,046 X

BEST AVAILABLE COPY

Patented Aug. 20, 1835.

Witness
Dan Bradford

Inventor
Andrew Caldwell

PETERS PHOTO-LITHOGRAPHER, WASHINGTON, D C 9.046 X

Sheet 2. 2 Sheets.

BEST AVAILABLE COPY

A. Caldwell.
Throstle.

Patented Aug. 20, 1835.

Witness
Dan'l Bradford,

Inventor
Andrew Caldwell

N. PETERS, PHOTO-LITHOGRAPHER, WASHINGTON D. C.

8-20-1835

9046X

The Schedule referred to in these Letters Patent, and making part of the same containing a description in the words of the said Andrew Caldwell himself of his improvement in the mode of Spinning hemp & flax by machinery.

To all to whom these presents shall come.
Be it known that I Andrew Caldwell of Lexington in the County of Fayette & State of Kentucky have invented a new and useful hemp & flax Spinning Machine adapted to spinning thread both chain & filling for cotton bagging bail rope twine and for other purposes.
The following is a description of the Machine: To construct a machine for one spindle a frame is made four feet long, four feet 8 inches high and about 2 wide from out to out, it is divided into two stories the under story is boxed in and within which is the machinery which imparts the traverse action to the spool. The spindle and spool is placed in a horizontal position upon the cover of the first story, this is done by having a pivot stand in front of the frame and a spring stand in the rear of the frame. The spindle is about two feet long from bearing to bearing. The flyers are fluted on the back to conduct the thread & are sufficiently large to take in a spool of seven inches in the clear and sufficiently wide to receive a spool five inches in the head. The spindle to be made of cast steel and a collar to be turned on the end of the tube which causes the eye of the spindle to be held fast in a brass box and cap placed on the pivot stand. This collar prevents it from sliping out when the rear end of the spindle is raised to take off or put on the spool & when raceing. The other end of the spindle runs in a brass bearing and is made fast by a cap and steel

9046X traverses on the drum as the spool is moved by the traverse
motion governing the spool. The office of this drum and
band are to regulate the taking up of the thread on the
spool. The band runs in grooves at the outer end of the
spool, one adapted to chains and the other to filing. The
only remaining pulley on the shaft the office of which
I am describing, is the pulley on the back end which
is called the geared propelling pulley, which gives
motion to the whole machine. On the outer end
of the second shaft, there is a pulley that conducts
a band to a pulley in the lower story which gives
action to the traverse motion which is governed by
a heart in the usual mode. a slide is attached to the
heart which extends through the covering under the
spindle & spool with a fork at the upper end of the
slide which fork catches to a flange on the outer
end of the spool and traverses the spool as the
heart revolves. I have only described the machine
so far as necessary for the operation of one spindle
by extending the length of the machine and ad-
ding similar machinary any number of spindles
may be put in operation. In addition to the
improvements upon the spindle above described
I have also improved the spindle in the following man-
ner, which I call the collared coupled spindle. The
same exhibited in the drawings hereto attached.
The shaft of the spindle is made separate from the flyer
and is designed to slide through the rear permanent
stand or spring stand sufficiently far to doff or put on
the spool, after the spool is put on or off you can
slip it back, and attach it to the flyer in a permanent
condition. By the machine I have invented and spring, by touching the spring the cap flys up, and the end of the spindle can be raised for the purpose of puting on or doffing the spool, while the eye of the spindle by means of the collar aforesaid is held fast in the pivot stand in front. The general form of the spindle is similar to the one in common use. The collar upon the tube end is claimed by me, also the flutes upon the flyers, together with the steel spring which fastens the cap on the rear end of the spindle as new and useful improvements. The spring above mentioned gives great facility in puting on & doffing the spool. On the top of the frame are placed two iron shafts one immediately across the frame over the spindle & the other in an oblique direction to the right as you stand in front, on the shaft last referred to there are placed several pullies and a traversed drum as described in the Drawings hereto attached as part of this specification. The small pulley on the end of the shaft drives a band which turns the real that receives the yarn from the spool. By this means any quantity of yarn may be thrown upon a large spool and the spool from whence it is taken be ready for use again.

The real is placed in front of the lower story. The next is a large pulley which drives a band attached to the pulley fastened on the spindle in front of the flyers, this pulley on the flyers has two groves one for giving the twist for chain and the other for giving the twist for filing thread, The next is a very small pulley ~~that~~ drives a band and gives motion to the second shaft fixed over the spindle. The next is a drum about one foot in length & sixteen inches in diameter, this drum I call a traverse drum and on which a round band is driven, attached to the outer end of the spool, the band 9046X 187 the improvements upon the Spindle (which requires one hand to each Spindle) I am enabled to spin twice as much yarn as is now spun by one hand in the ordinary mode besides having brought the operation of spinning in the compass of a room, and adapted it to a new source of labor old & young male & female.

Witnessed
James E. Davis
Jas M. Lear

A. Caldwell ( Received & Recorded anew November 11. 1844 )

Drawings 1345 words

Exd
[illegible]